United States Patent
Mertens et al.

(12) 
(10) Patent No.: US 6,299,319 B1
(45) Date of Patent: Oct. 9, 2001

(54) INTERIOR REARVIEW MIRROR FOR VEHICLES, IN PARTICULAR, MOTOR VEHICLES

(75) Inventors: Jens Mertens, Stuttgart; Bernd Rommel, Fellbach, both of (DE)

(73) Assignee: Reitter & Schefenacker GmbH & Co. KG, Esslingen (DE)

(*) Notice: Subject to any disclaimer, the term of this patent is extended or adjusted under 35 U.S.C. 154(b) by 0 days.

(21) Appl. No.: 09/540,171

(22) Filed: Mar. 31, 2000

(30) Foreign Application Priority Data

Apr. 1, 1999 (DE) .................................. 299 06 103

(51) Int. Cl.⁷ .................................................. G02B 7/182
(52) U.S. Cl. .............................................. 359/871; 359/872
(58) Field of Search ............................. 359/871, 872; 250/208.1, 227.25, 341.7, 339.1; 318/443, 444, 480, 483

(56) References Cited

U.S. PATENT DOCUMENTS 6,066,933 * 5/2000 Ponziana ........................ 318/483
6,097,024 * 8/2000 Stam et al. ................... 250/208.1

* cited by examiner

*Primary Examiner*—Mohammad Sikder
(74) *Attorney, Agent, or Firm*—Gudrun E. Huckett

(57) ABSTRACT

An interior rearview mirror for a vehicle has a mirror base and a mirror head connected to the mirror base. A rain sensor is arranged in the mirror base. The mirror base is connected to a base plate glued to the windshield of the vehicle by clamping and securing elements engaging depressions in the base plate. The rain sensor is pressed against the windshield by the pulling force of the clamping and securing elements acting on the mirror base.

24 Claims, 3 Drawing Sheets

INTERIOR REARVIEW MIRROR FOR VEHICLES, IN PARTICULAR, MOTOR VEHICLES

BACKGROUND OF THE INVENTION

1. Field of the Invention

The invention relates to an interior rearview mirror of vehicles, in particular, motor vehicles, comprising a mirror base to which is connected a mirror head with mirror pane.

2. Description of the Related Art

Such interior rearview mirrors are usually connected with their mirror base either by means of adhesives to the windshield of the vehicle or by means of, for example, screws to the roof of the vehicle.

SUMMARY OF THE INVENTION

It is an object of the present invention to configure an interior rearview mirror of the aforementioned kind such that it can be secured easily to the vehicle.

In accordance with the present invention, this is achieved in that at least one rain sensor is provided at the mirror base which is forced by the mirror base against the windshield of the vehicle.

In the interior rearview mirror according to the present invention the rain sensor is forced by the mirror base against the windshield of the vehicle. The rain sensor is advantageously arranged within the mirror base. Accordingly, there is no need for two separate fastening locations at the vehicle, i.e., one for the interior rearview mirror and one for the rain sensor.

DESCRIPTION OF THE PREFERRED EMBODIMENT

At the inner side of a windshield 1 of a motor vehicle a base plate 20 is fastened by means of an adhesive. It is of an annular configuration and has a substantially rectangular shape. A rain sensor 8 is forced through this ring against the windshield 1 of the vehicle in a manner to be described in the following. The task of the rain sensor 8 is to automatically switch on the windshield wipers of the motor vehicle according to the amount of rain falling onto the windshield 1 and sensed by the rain sensor 8.

Figure 1:
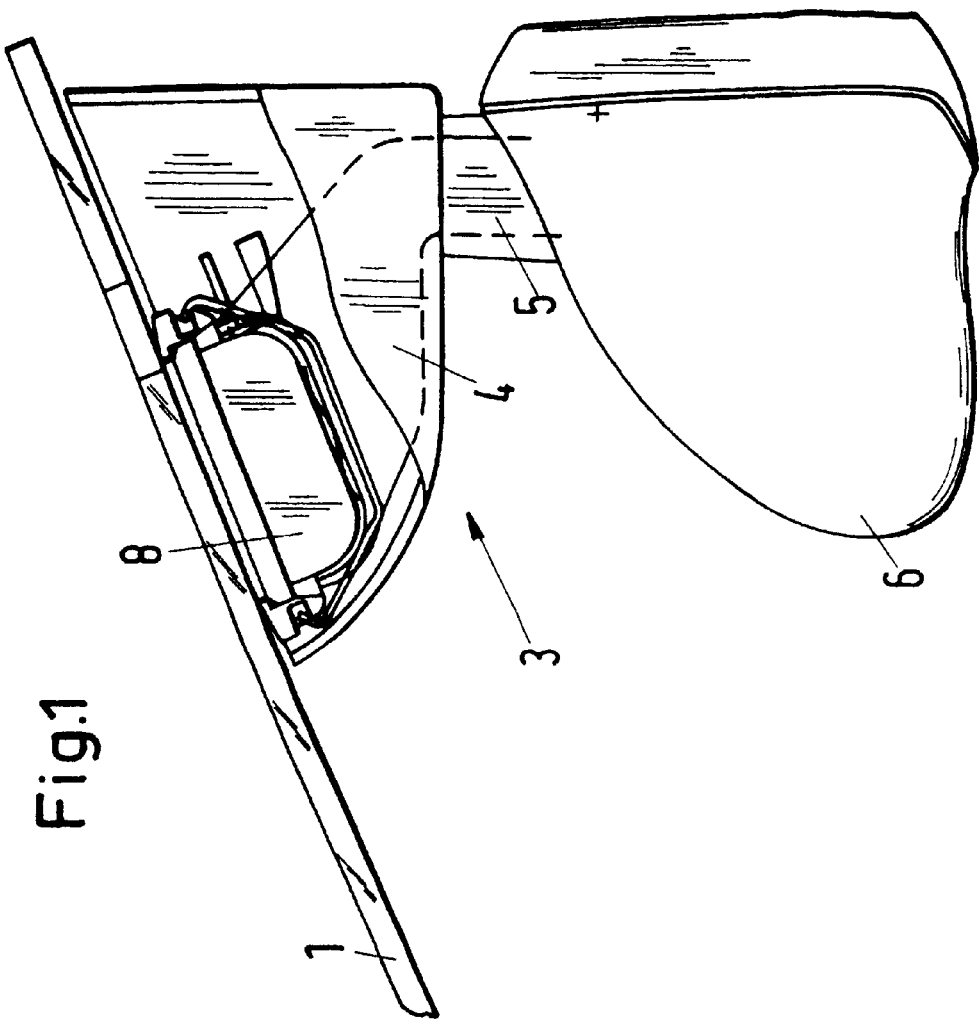
FIG. 1 shows an interior rearview mirror according to the invention fastened to the windshield of a motor vehicle.
Figure 3:
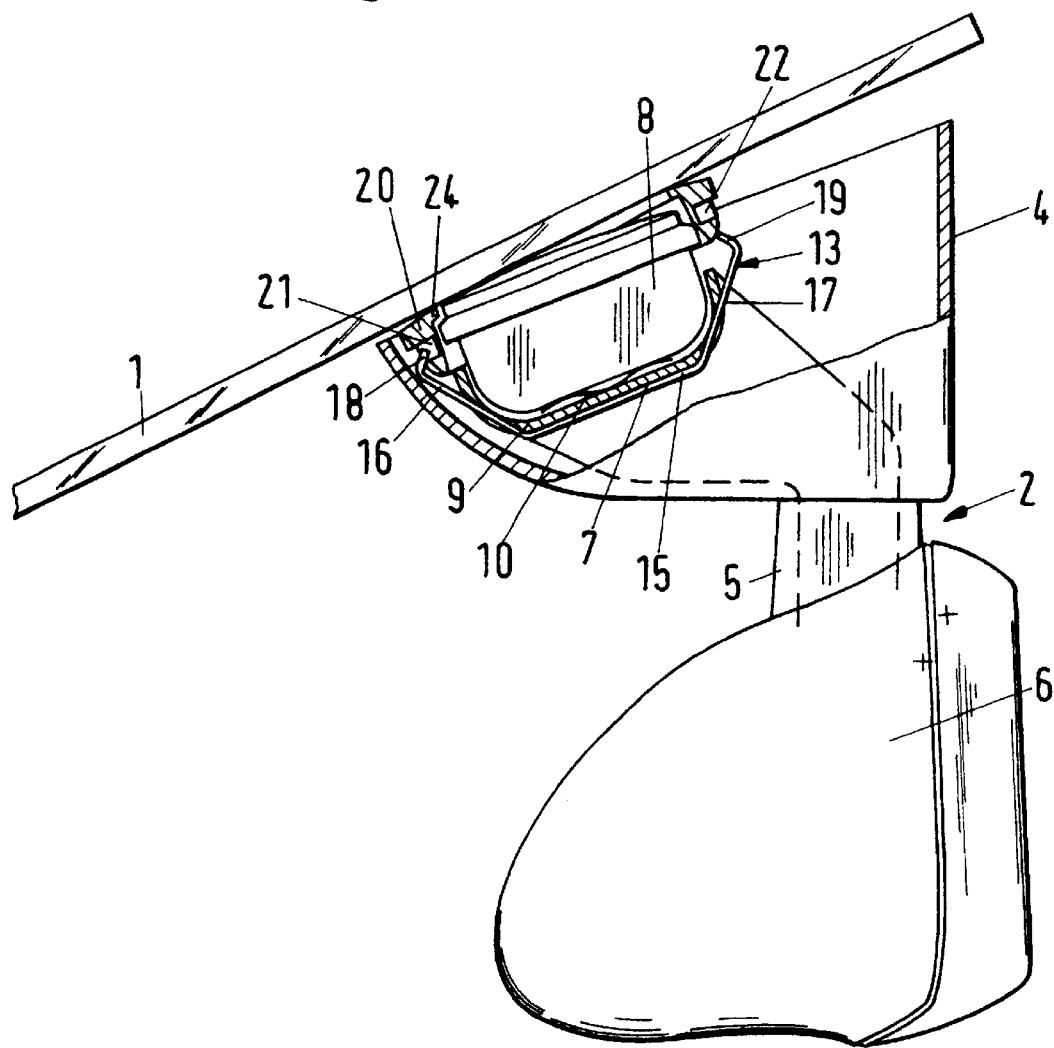
FIG. 3 shows partially in an end view and partially in section the interior rearview mirror according to the invention in a first phase of its attachment.
Figure 4:
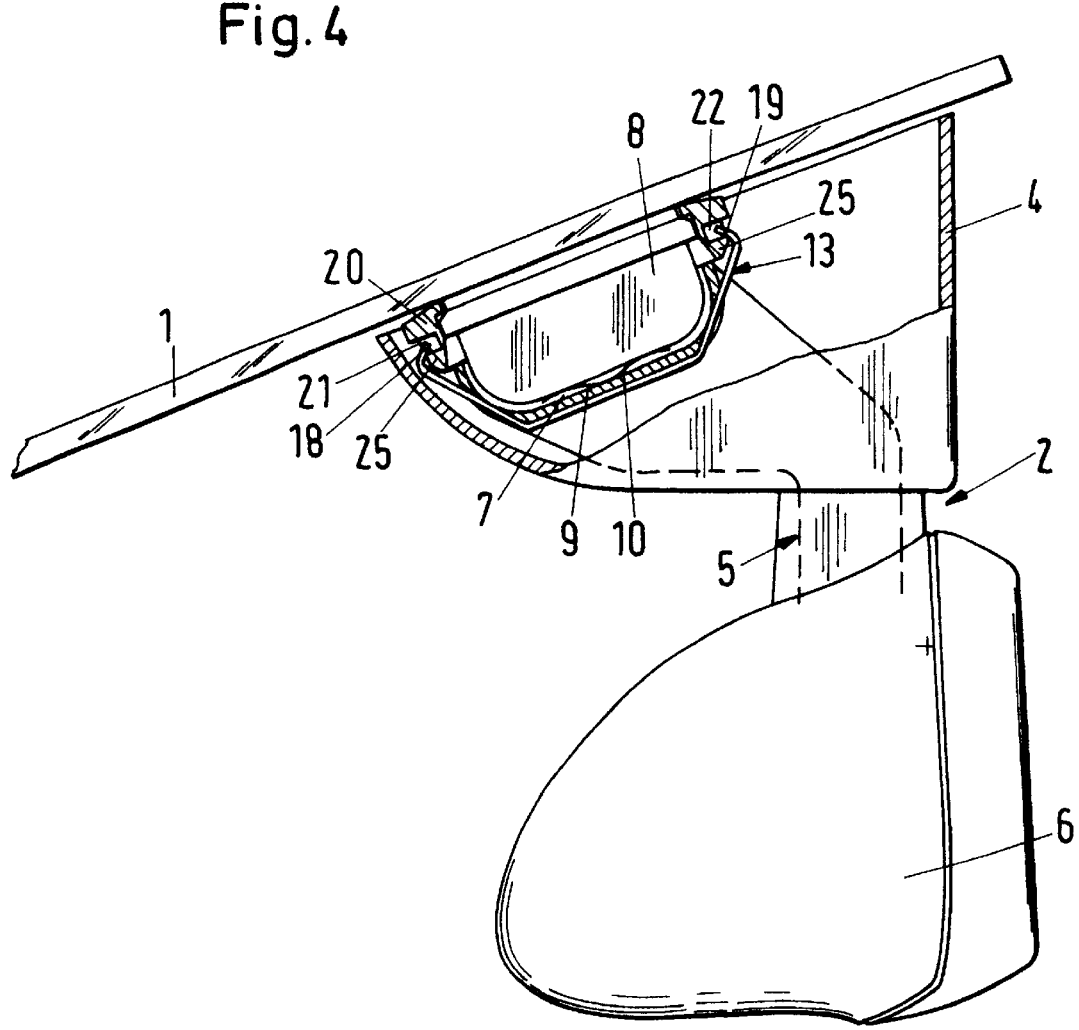
FIG. 4 shows in a representation according to FIG. 3 the interior rearview mirror in the mounted position.

The base plate 20 serves for securing and supporting an interior rearview mirror 3. The rearview mirror 3 has a mirror base 2 with a cover 4 and a mirror head 6 secured by a support arm 5 to the mirror base 2. The mirror head 6 has a mirror pane (not shown) and is adjustable relative to the support arm 5 in a manner known in the art. The cover 4 of the mirror base 2 is hollow and receives in the mounted position (FIGS. 1 and 4) the substantially cup-shaped rain sensor 8. Accordingly, the rain sensor 8 is not visible from the interior of the vehicle. The cover 4, as can be seen in FIGS. 3 and 4, is hood-shaped and has a substantially triangular cross-section. The support arm 5 projects into the cover 4 and is fastened therein to the base plate 20 in a manner to be disclosed in the following.

Figure 2:
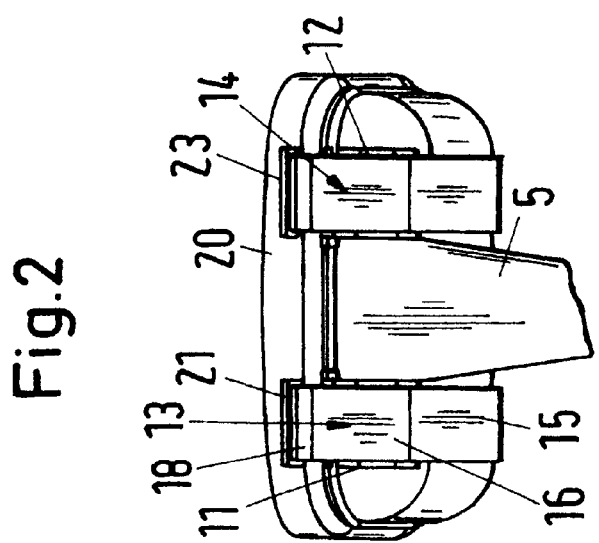
FIG. 2 shows in perspective illustration the fastening area of the interior rearview mirror according to FIG. 1.

As is shown in FIGS. 3 and 4, the end portion of the support arm 5 positioned within the cover 4 is provided with a recess 7 which is matched to the cross-sectional shape of the rain sensor 8. The recess 7 in the shown embodiment thus has a U-shaped cross-section. Between the bottom 9 of the recess 7 and the rain sensor 8 at least one wave-shaped spring 10 is provided. In the mounted position of the interior rearview mirror 3, this spring 10 is elastically deformed (tensioned). Within the cover 4 the end portion of the support arm 5 with the recess 7 embraces or surrounds the rain sensor 8. The free end portion of the support arm 5 has perpendicularly laterally projecting transverse members 11, 12 (FIG. 2) which advantageously have the same contour shape as the recess 7 of the support arm 5. Accordingly, the transverse members 11, 12 embrace the rain sensor 8 in the same manner as the portion of the support arm 5 (recess 7) between the transverse members 11, 12. The transverse members 11, 12 have a U-shaped cross-section and are configured to receive respectively a clamping and securing element 13, 14. The clamping and securing elements 13, 14 are strip-shaped and spring-elastic or springy. They have a planar middle portion 15 (FIG. 3) which at both ends has a transition into slantedly and outwardly oriented legs 16 and 17, positioned at an obtuse angle to the middle portion 15. The free ends 18, 19 of the slantedly and outwardly oriented legs 16, 17 diverging from the middle portion 15 are oriented toward one another.

The base plate 20 has a circumferential thick rim with which it is glued to the inner side of the windshield 1. At the level of the clamping and securing elements 13, 14 the circumferential outer sidewall of the rim of the base plate 20 is provided with depressions 21 through 23 which are engaged by the angled free ends 18, 19 of the clamping and securing elements 13, 14 in the mounted position of the interior rearview mirror 3.

At least in the area of the depressions 21 through 23 the circumferential rim of the base plate 20 has a rim portion 25, extending from a plane in which the depressions 21 through 23 are arranged in a direction away from the windshield 1 toward the support arm 5, which is rounded (FIGS. 3 and 4). This rounded configuration makes it possible to easily insert the angled ends 18, 19 of the clamping and securing elements 13, 14 into the depressions 21 through 23. The transverse members 11, 12 have a cross-sectional width matched to the width of the clamping and securing elements 13, 14. Accordingly, the clamping and securing elements 13, 14 are secured in their longitudinal direction in their respective position by the lateral legs of the U-shaped transverse members 11, 12. Mounting of the interior rearview mirror 3 is thus considerably simplified. The mirror base 2 can be easily placed onto the base plate 20 such that the angled ends 18, 19 of the clamping and securing elements 13, 14 will reliably slide into the depressions 21 through 23 provided in the rim of the base plate to 20.

As can be seen in FIG. 3, the mirror base 2 is placed slantedly onto the rim of the base plate 20 already fastened to the inner side of the windshield 1. Before doing this, the rain sensor 8 has been inserted into the recess 7 of the support arm 5 of the mirror base 2. The angled ends 18 of the two clamping and securing elements 13, 14 positioned on both sides of the support arm 5 engage in this slanted position the depressions 21, 23 provided in the rim of the base plate 20. The other ends 19 of the clamping and securing elements 13, 14 rest external to the depressions 22 on the rounded portion 25 of the circumferential rim of the base plate 20 (FIG. 3). In this position the mirror base 2 is positioned at a slant to the windshield 1.

In order to bring the interior rearview mirror 3 into its mounted end position, the mirror base 2 is rotated counter to the clockwise direction toward the windshield 1. When doing so, the angled end 19 of the clamping and securing elements 13, 14 slide along the rounded portions of the rim of the base plate 20 until the angled ends 19 snap into the depressions 22 at the rim of the base plate. During this pivoting process of the mirror base 2, the clamping and securing elements 13, 14 are elastically widened until the angled end 19 can snap into the depressions 22 of the base plate 20. During the pivot process the other angled ends 18 of the clamping and securing elements 13, 14 stay engaged within the depression 21. The clamping and securing elements 13, 14 are designed such that in the mounted position they are elastically deformed and thus tensioned so that the interior rearview mirror 3 is securely held at the base plate 20. This is further enhanced by the wave-shaped spring 10 positioned between the rain sensor 8 and the bottom 9 of the recess 7. In the mounted position of the interior rearview mirror 3, the spring 10 is elastically deformed by the rain sensor 8 resting against the windshield 1. The rain sensor 8 with its spherical top surface rests securely against the windshield 1 because of the pretension of the wave-shaped spring 10.

Because of the disclosed pivot movement of the interior rearview mirror 3 during mounting, the rain sensor 8 is not moved across the windshield 1 so that there is no risk of damaging the sensitive rain sensor. The pivot movement ensures a bubble-free pressing onto the windshield 1 of the connecting layer of the rain sensor 8 comprised preferably of silicone.

The cover 4 of the mirror base 2 has a minimal spacing from the windshield 1 in the mounted position (FIG. 4). The rain sensor 8, the corresponding end portion of the support arm 5 with the transverse members 11, 12, and the clamping and securing elements 13, 14 are positioned so as to be covered within the hood-shaped cover 4 which is advantageously made of plastic material.

The rim portions 25 of the rim of the base plate 20 facing the support arm 5 and positioned adjacent to the narrow depressions 21 through 23 are in cross-section rounded or slanted so that the corresponding free ends 18, 19 of the clamping and securing elements 13, 14 can slide along their respective rim portion 25 easily into the corresponding depressions 21 through 23 during the pivot movement of the interior rearview mirror 3 into the end position of the mirror. The free ends 18, 19 are provided approximately at a right angle, or an angle slightly greater than a right angle, relative to the neighboring legs 16, 17 of the clamping and securing elements 13, 14 so that the interior rearview mirror 3 is securely held by the ends 18, 19 in the depressions 21 through 23 of the base plate 20. The cover 4 is, of course, fixedly connected to the support arm 5. Only the mirror head 6 can be moved relative to the support arm 5, and thus relative to the mirror base 2, for adjusting a proper position of the mirror 3 for the driver.

While specific embodiments of the invention have been shown and described in detail to illustrate the inventive principles, it will be understood that the invention may be embodied otherwise without departing from such principles.

What is claimed is:
1. An interior rearview mirror for a vehicle, said interior rearview mirror comprising:
   a mirror base (2) configured to be connected to a windshield (1) of the vehicle;
   a mirror head (6) connected to said mirror base (2);
   at least one rain sensor (8) arranged in said mirror base (2) and secured by said mirror base (2) on the windshield (1);
   a base plate (20) configured to connect said mirror base (2) to the windshield (1) so that said at least one rain sensor (8) is secured on the windshield (1) with interposition of said base plate (20);
   at least one clamping and securing element (13, 14) configured to secure said mirror base (2) to said base plate (20);
   wherein said base plate (20) has depressions (21, 22, 23) and wherein said at least one clamping and securing element (13, 14) engages said depressions (21, 22, 23);
   wherein said at least one clamping and securing element (13, 14) has angled ends (18, 19) engaging said depressions (21, 22, 23);
   wherein said base plate (20) has a rim portion (25) extending from a plane in which said depressions (21–23) are arranged in a direction away from the windshield (1), wherein said rim portion (25) is configured such that said angled ends (18, 19), initially resting against said rim portion (25) during mounting of said interior rearview mirror (3) on the windshield, slide into said depressions (21–23) when said interior rearview mirror (3) is pivoted during mounting.

2. The interior rearview mirror according to claim 1, wherein said mirror base (2) has a support arm (5) on which said mirror head (6) is supported.

3. The interior rearview mirror according to claim 1, wherein said rim portion (25) has a curved or slanted profile in cross-section.

4. An interior rearview mirror for a vehicle, said interior rearview mirror comprising:
   a mirror base (2) configured to be connected to a windshield (1) of the vehicle;
   a mirror head (6) connected to said mirror base (2);
   at least one rain sensor (8) arranged in said mirror base (2) and secured by said mirror base (2) on the windshield (1);
   wherein said mirror base (2) has a support arm (5) on which said mirror head (6) is supported;
   wherein said mirror base (2) has a cover (4) and said support arm (5) projects into said cover (4), wherein said at least one rain sensor (8) in a mounted position of said interior rearview mirror (3) is positioned inside said cover (4).

5. The interior rearview mirror according to claim 4, further comprising a base plate (20) configured to connect said mirror base (2) to the windshield (1) so that said at least one rain sensor (8) is secured on the windshield (1) with interposition of said base plate (20).

6. The interior rearview mirror according to claim 5, further comprising at least one clamping and securing element (13, 14) configured to secure said mirror base (2) to said base plate (20).

7. The interior rearview mirror according to claim 6, wherein said at least one clamping and securing element (13, 14) is spring-elastic.

8. The interior rearview mirror according to claims 6, wherein said at least one clamping and securing element (13, 14) is strip-shaped.

9. The interior rearview mirror according to claim 6, wherein said at least one clamping and securing element (13, 14) is a bracket.

10. The interior rearview mirror according to claim 6, wherein said mirror base (2) is pulled against said base plate (20) by a force exerted by said at least one clamping and securing element (13, 14).

11. The interior rearview mirror according to claim 6, wherein said base plate (20) has depressions (21, 22, 23) and wherein said at least one clamping and securing element (13, 14) engages said depressions (21, 22, 23).

12. The interior rearview mirror according to claim 11, wherein said at least one clamping and securing element (13, 14) has angled ends (18, 19) engaging said depressions (21, 22, 23).

13. The interior rearview mirror according to claim 11, wherein said base plate (20) has an outer circumferential sidewall and wherein said depressions (21–23) are provided in said outer circumferential sidewall.

14. The interior rearview mirror according to claim 6, wherein said at least one clamping and securing element (13, 14) exerts a pulling force on said base plate (2) and wherein said mirror base (2) is configured such that a pressure force counteracting the pulling force of said at least one clamping and securing element (13, 14) is provided, wherein the pulling force is greater than the pressure force.

15. The interior rearview mirror according to claim 14, wherein said mirror base (2) has a spring (10) generating the pressure force.

16. The interior rearview mirror according to claim 15, wherein said spring (10) is located between said at least one rain sensor (8) and said support arm (5).

17. The interior rearview mirror according to claim 6, wherein said at least one clamping and securing element (13, 14) embraces said at least one rain sensor (8) on three sides of said at least one rain sensor (8).

18. The interior rearview mirror according to claim 4, wherein said mirror base (2) has a cover (4) and said support arm (5) projects into said cover (4) of said mirror base (2).

19. The interior rearview mirror according to claim 4, wherein said at least one clamping and securing element (13, 14) is provided on said support arm (5).

20. The interior rearview mirror according to claim 4, wherein said support arm (5) has a bearing for said at least one clamping and securing element (13, 14).

21. The interior rearview mirror according to claim 20, wherein said support arm (5) has at least one laterally positioned transverse member (11, 12) forming said bearing.

22. The interior rearview mirror according to claim 21, wherein two of said laterally positioned transverse members (11, 12) are positioned on opposite sides of said support arm (5), wherein each one of said laterally positioned transverse members receives one of said at least one clamping and securing members (13, 14).

23. The interior rearview mirror according to claim 21, wherein said support arm (5) has an end portion remote from said mirror head (6) and said at least one laterally positioned transverse member (11, 12) projects transversely from said end portion of said support arm (5).

24. The interior rearview mirror according to claim 21, wherein said at least one laterally positioned transverse member (11, 12) has a U-shaped cross-section.

\* \* \* \* \*

UNITED STATES PATENT AND TRADEMARK OFFICE
CERTIFICATE OF CORRECTION

PATENT NO.    : 6,299,319 B1
DATED         : October 9, 2001
INVENTOR(S)   : Mertens et al.

It is certified that error appears in the above-identified patent and that said Letters Patent is hereby corrected as shown below:

<u>Title page,</u>
Under the heading [30] Foreign Application Priority Data, the number of the priority document "299 06 103" should read -- 299 06 013 --.

Signed and Sealed this

Eleventh Day of June, 2002

*Attest:*

*Attesting Officer*

JAMES E. ROGAN
*Director of the United States Patent and Trademark Office*